United States Patent [19]
Redemann

[11] 3,809,364
[45] May 7, 1974

[54] CASSETTE-SLIDE SYNCHRONIZER
[76] Inventor: James W. Redemann, 1368½ Cherry St., Green Bay, Wis. 54301
[22] Filed: Dec. 18, 1970
[21] Appl. No.: 99,477

[52] U.S. Cl. .................................. 353/15, 274/4 C
[51] Int. Cl. ........................................... G03b 31/06
[58] Field of Search ............. 353/15, 16, 17, 18, 19; 274/4 A, 4 B, 4 C, 4 D, 4 E, 4 F, 4 G, 11 A, 11 B, 11 C, 11 D; 242/188

[56] References Cited
UNITED STATES PATENTS
| | | | |
|---|---|---|---|
| 3,102,699 | 9/1963 | Proctor | 274/4 D |
| 3,008,012 | 11/1961 | Proctor | 274/4 C |
| 3,594,077 | 7/1971 | Marquis | 353/15 |
| 3,666,203 | 5/1972 | Sato | 242/188 |

FOREIGN PATENTS OR APPLICATIONS
| | | | |
|---|---|---|---|
| 1,236,463 | 6/1960 | France | 353/15 |
| 1,457,326 | 9/1966 | France | 353/15 |

Primary Examiner—William D. Martin, Jr.
Assistant Examiner—A. Jason Mirabite
Attorney, Agent, or Firm—Clarence A. O'Brien; Harvey B. Jacobson

[57] ABSTRACT

Operation of the slide advancing mechanisms in one or more slide projectors is automatically controlled by signals from a cassette-type of tape recorder and player. Conductive strips are mounted on the tape stored in the cassette in order to generate the slide advancing signals when the strips bridge contact surfaces on spaced guide posts in contact with the tape. The signals are conducted by a plug-in cable from the posts to each slide projector.

11 Claims, 5 Drawing Figures

James W. Redemann
INVENTOR.

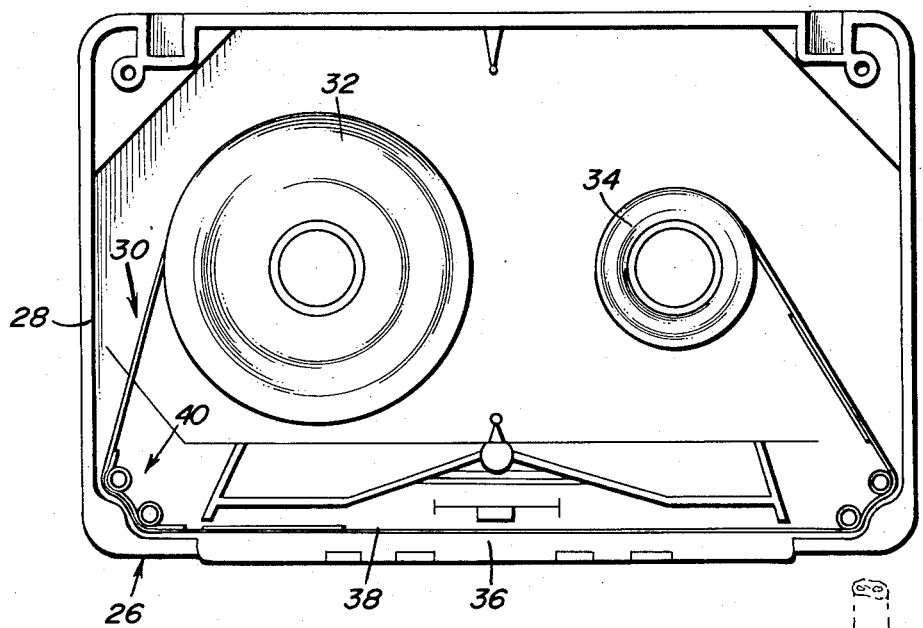
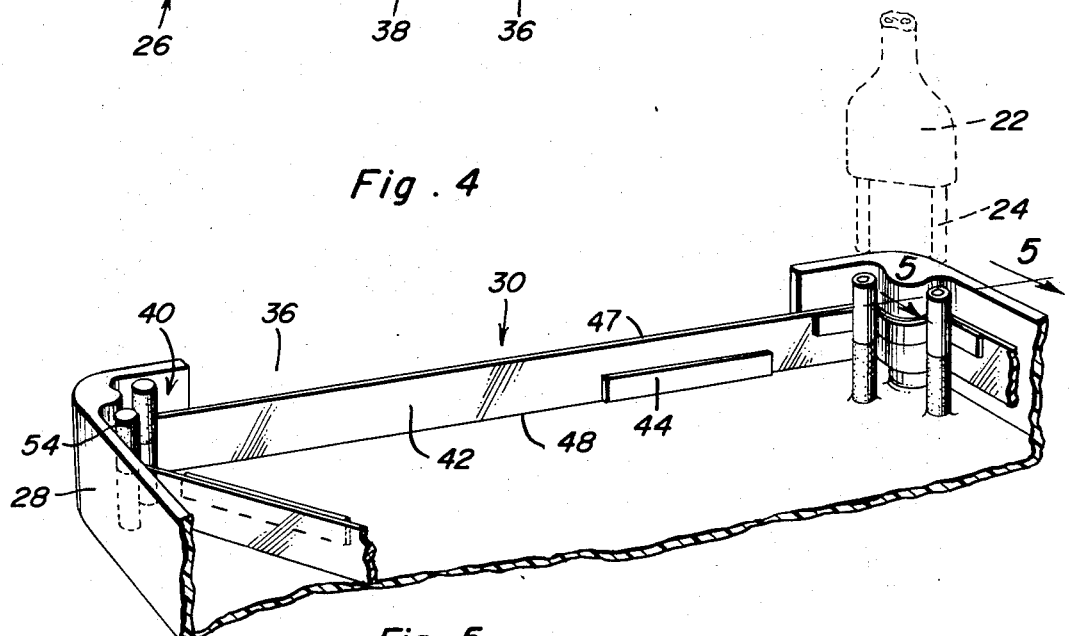
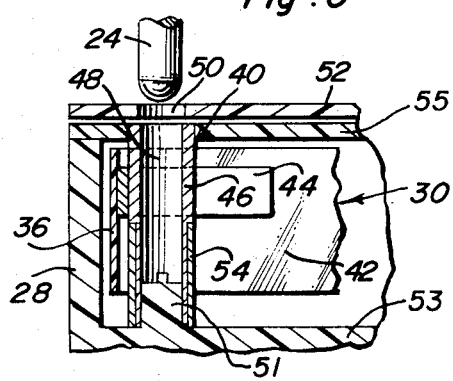

CASSETTE-SLIDE SYNCHRONIZER

This invention relates to apparatus for automatically operating the slide advancing mechanism associated with a slide projector in synchronism with play-back operation of a sound recording and reproducing device in order to correlate audio and visual portions of a program.

Automatic synchronizing systems for slide projectors and audio reproducing devices, are well known. In most cases, such synchronizing systems involve expensive equipment and/or require special and substantial modification of either the slide projector or the audio reproducing device. Thus, commercially available slide projectors and audio reproducing devices are unsuitable without extensive modification making them unsuitable for their originally intended use. It is therefore an important object of the present invention to provide a synchronizing system interrelating commercial types of slide projectors and audio recorder-player devices without use of any additional expensive equipment or extensive modification of either the slide projector or the tape recorder-player. More particularly, it is an important object of the present invention to synchronize operation of any remotely controllable slide projector with audio reproduction from a cassette-type of tape recorder-player.

In accordance with the present invention, the closely spaced corner guide posts associated with a tape storing cassette is modified so as to receive the prongs of a plug associated with a signal conducting cable plugged in at its opposite end to the remote control terminals of a slide projector. The guide posts are made of an electrically conductive material so that a slide advancing signal will be generated when external contact surfaces on the guide posts are bridged by conductive strips mounted on the back side of the tape as it is being advanced by the tape drive associated with the recorder-player device into which the cassette is seated. The signal producing conductive strips may be in the form of an adhesive sensing tape applied to the audio tape at desired locations. Thus, the synchronizing system of the present invention, the techniques involved and the ease with which the visual and audio portions of a program may be correlated, will be very practical for high school and college students and an incentive to educators to develop their own unique programs as well as for industry to prepare and package instructional presentations at reduced cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a top plan view with the cover removed of a tape cassette modified in accordance with the present invention.

FIG. 4 is a perspective view of a portion of the cassette illustrated in FIG. 3.

FIG. 5 is an enlarged partial sectional view taken substantially through a plane indicated by section line 5—5 in FIG. 4

Figure 1:
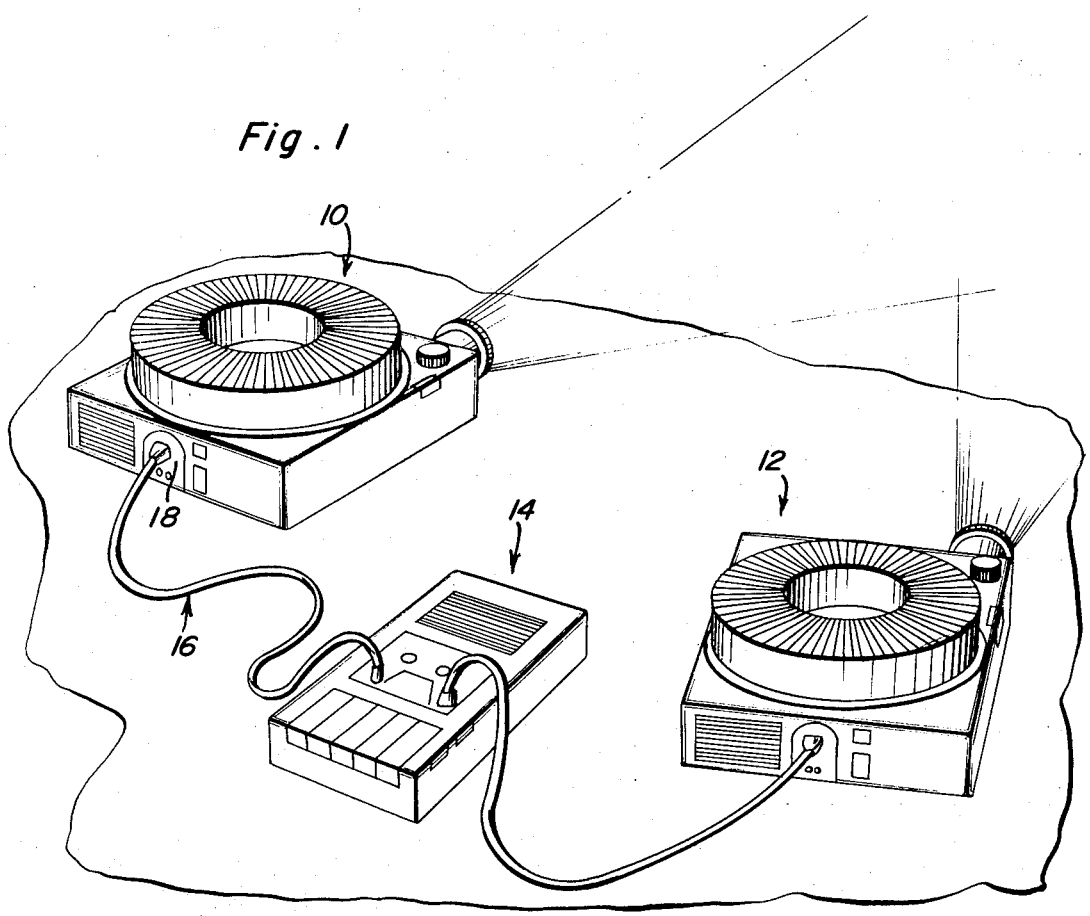
FIG. 1 is a perspective view showing a typical installation for the invention.
Figure 2:
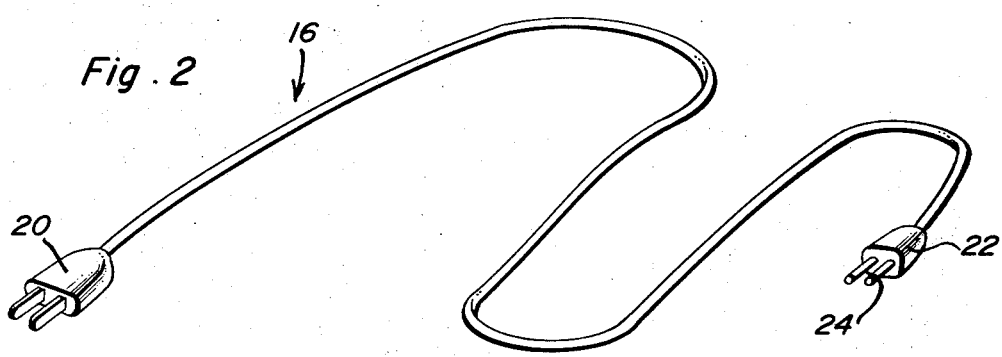
FIG. 2 is a perspective view illustrating the synchronizing signal cable utilized in the system of the present invention.

Referring now to the drawings in detail, FIG. 1 illustrates a pair of slide projectors 10 and 12 projecting a visual program synchronized with the sound reproduction from a cassette-type of sound recording and reproducing device generally referred to by reference numeral 14. The sound recording and reproducing device 14 is operationally interconnected with the two slide projectors 10 and 12 by means of a pair of synchronizing signal conducting cables 16. The slide projectors 10 and 12 may be of any commercially available type, FIG. 1 merely showing by way of example a rotary magazine type of slide projector. The slide projector utilized must however be of a type capable of being remotely controlled. Each slide projector accordingly includes a remote controlled terminal plate 18 adapted to receive the prongs of a plug 20 connected to one end of the synchronizing signal cable 16 as more clearly seen in FIG. 2. The other end of the cable 16 is provided with a second plug 22 also having a pair of contact prongs 24 adapted to be inserted into the sound recording and play-back device 14.

The sound recording and play-back device as aforementioned, is of the cassette type and accordingly seats a magnetic tape storing cassette as illustrated in FIG. 3 generally denoted by reference numeral 26. The cassette is of any widely distributed commercial type which includes a housing 28 within which a recording medium in the form of magnetic tape 30 is stored in order to record audio signals thereon or play back audio signals previously recorded thereon. The tape is advanced between the reels 32 and 34 in a conventional manner by a tape drive mechanism associated with the device 14 which projects into a front opening 36 in the elongated front wall of the housing through which one side 38 of the tape is exposed to both the tape drive mechanism as well as the recording and pickup heads (not shown). The tape is advanced past the opening 36 between two pair of closely spaced guide posts 40 located adjacent the corners of the housing 28.

As more clearly seen in FIG. 4, the magnetic tape 30 is in contact with the posts 40 on the side 42 opposite the side 38 exposed through the opening 36. Conductive strips in the form of adhesive-sensing tape 44 are mounted on the side 42 of the magnetic tape 30 adjacent one or the other of the two opposite longitudinal edges 47 and 48. The magnetic tape 30 is entrained about each of the guide posts 40 and spans axially spaced portions thereof so that the conductive strips 44 may bridge outside contact surfaces on each pair of posts 40 in order to generate a synchronizing signal which is conducted through the cable 16.

As more clearly seen in FIGS. 4 and 5, each of the posts 40 includes a tubular member 46 made of a conductive material fixedly mounted on a formation 51 projecting from the bottom wall 53 of the housing 28 to present a socket opening 48 receiving one of the prongs 24 of the plug 22 at on axial end through an aligned opening 50 in the cover 52 of the cassette. Thus, the sockets 48 in the tubular members 46 form contact surfaces accessible from outside the cassette through which electrical paths are established from the prongs 24 to the outside contact surfaces of the posts. The tubular member 46 at its open axial end therefore extends through an opening in the top wall 55 of the housing. One axial portion of the tubular member 46 is externally coated with a non-conductive material 54 so that the other axial portion flush therewith forms the aforementioned contact surface adapted to be engaged by the conductive strips 44 located along the adjacent longitudinal edge of the tape 42. It will therefore be apparent that the magnetic tape 30 may be conditioned by application of conductive strips 44 at desired locations in order to control the two different slide projectors 10 and 12. Toward this end, the nonconductive coatings 54 are applied to one pair of guide posts 40 in axially spaced relation to the non-conductive coatings applied to the other pair of guide posts as shown in FIG. 4. The signals generated by bridging of the conductive surfaces of the posts by the conductive strips 44 are therefore picked up by the prongs 24 received within the sockets 48 in the guide posts. The conductive strips 44 must of course be of a length exceeding the spacing between the guide posts.

In order to utilize the system of the present invention, program material is recorded on the tape 30 within the cassette after which it is rewound. The material recorded on the tape is then played back at the same time that operation of the slide projector is initiated. Whenever a change in slide is desired, playback operation of the device 14 is stopped and the cassette removed. The center portion of the tape exposed through the opening 36 in the cassette is then marked and a predetermined length of tape pulled out of the cassette, such as 8 inches. A suitable distance from the mark, conductive sensing tape of a sufficient length is applied to the back side 42 of the tape. The tape is then rewound into the cassette. Play-back operation of the device is then resumed and the foregoing procedure repeated for each desired change in slide. Thereafter, the slide projectors will be automatically synchronized with play-back operation of the device 14 by merely plugging in the cable 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an electrically controlled device and a record player adapted to receive a record storing cassette having a housing enclosing a recording medium and at least one guide post with which the recording medium is in contact, a system for synchronizing operation of the device with reproduction of audio signals recorded on said recording medium, comprising conductive strips mounted on the recording medium, a signal conducting cable connected to the electrically controlled device having connector means engageable with the guide post, said guide post having an externally conductive contact portion engaged by the conductive strips during movement of the recording medium by the record player, said cassette housing including a second guide post in contact with the recording medium and an externally conductive portion on the second guide post axially spaced from the externally conductive portion on the first mentioned guide post.

2. The combination of claim 1 wherein each of said guide posts is a tubular member made of a conductive material and non-conductive means externally coating a portion of the tubular member leaving said conductive portion exposed.

3. In combination with an electrically controlled device and a record player adapted to receive a record storing cassette having a housing enclosing a recording medium and at least one guide post with which the recording medium is in contact, a system for synchronizing operation of the device with reproduction of audio signals recorded on said recording medium, comprising conductive strips mounted on the recording medium, a signal conducting cable connected to the electrically controlled device having connector means engageable with the guide post, said guide post having an externally conductive contact portion engaged by the conductive strips during movement of the recording medium by the record player, said connector means including a plug mounting a prong connected to one end of the cable, said guide post having a socket receiving the prong.

4. The combination of claim 3 wherein said guide post is a tubular member made of a conductive material and non-conductive means externally coating a portion of the tubular member leaving said conductive portion exposed.

5. In combination with an electrically controlled device and a record player adapted to receive a record storing cassette having a housing enclosing a recording medium and at least one guide post with which the recording medium is in contact, a system for synchronizing operation of the device with reproduction of audio signals recorded on said recording medium, comprising conductive strips mounted on the recording medium, a signal conducting cable connected to the electrically controlled device having connector means engageable with the guide post, said guide post having an externally conductive contact portion engaged by the conductive strips during movement of the recording medium by the record player, said guide post being a tubular member made of a conductive material and non-conductive means externally coating a portion of the tubular member leaving said conductive portion exposed.

6. The combination of claim 5 wherein said recording medium is magnetic tape and said conductive strip is adhesive sensing tape.

7. The combination of claim 5 wherein said tape has opposite longitudinal edges and each of said conductive strips is mounted on the opposite side of the tape adjacent one of the longitudinal edges.

8. A tape cassette within which recording tape is stored, including a housing having an opening through which the tape is exposed on one side, at least one tape guiding post positioned within the housing adjacent said opening externally engaged by the tape on the other side there said post being made of an electrically conductive material and internally forming a prong-receiving socket, insulating means externally coating a portion of the post, and conductive means mounted on said other side of the tape for electrical contact with the post during movement of the tape.

9. In combination with the tape cassette defined in claim 7, a separate electrically controlled device, a cable connected to said device and connector means inserted into the socket of the post for controlling operation of said device through the cable.

10. In a tape cassette for a tape recorder, said cassette including a housing having opposite top and bottom walls and an elongated front wall connecting said top and bottom walls and provided with an opening receiving operating elements of an associated tape recorder when the cassette is mounted on the tape recorder, a pair of tape reels rotatably mounted in said housing and adapted to be driven by the associated tape recorder, and guide means for guiding a tape from one of the reels to the other reel in a path extending along said front wall and past said opening for cooperation with said elements, the improvement in the guide means which comprises: a plurality of posts secured in said housing adjacent said front wall, said posts having respective axes extending between said top and bottom walls, an electrically conductive outer surface portion mounted on each of the posts and contact means electrically connected to said outer surface portions on the posts accessible from outside the cassette, whereby a circuit is closed when a length of conductive tape simultaneously engages the outer surface portions of two of said posts.

11. The combination of claim 10 wherein said contact means includes internal openings formed in the posts adapted to receive contact prongs through aligned openings in the housing.

* * * * *